Patented Mar. 4, 1941

2,233,496

UNITED STATES PATENT OFFICE 2,233,496

DYESTUFFS OF THE ANTHRAQUINONE SERIES

Frederic Bennett Stilmar, Woodstown, N. J., assignor to E. I. du Pont de Nemours & Company, Wilmington, Del., a corporation of Delaware No Drawing. Application May 10, 1939, Serial No. 272,775

6 Claims. (Cl. 260—329)

This invention relates to the preparation of new and valuable dyestuffs of the anthraquinone series. The invention relates more particularly to the preparation of new dyestuffs by the condensation of the new thiophenanthrone carboxylic acids of my copending application, Serial No. 264,125, filed March 25, 1939, with aminoanthraquinone compounds.

In my copending application above mentioned, I have described the preparation of new dyestuff intermediates of 1,9-thiophenanthrone-2-carboxylic acid of the general formula

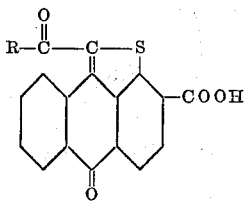

in which R stands for a radical of the class consisting of alkyl radicals containing from 1 to 5 carbon atoms and radicals of the benzene series. These compounds are prepared by condensing 1-mercapto-2-anthraquinone carboxylic acid disodium salt with alpha halogen ketones of the general formula

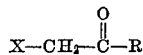

in which X stands for halogen, and R has the same significance as above. As stated in that application, these new thiophenanthrone carboxylic acid derivatives are valuable in the preparation of acidylaminoanthraquinone dyestuffs of modified shades in the yellow to red range of enhanced brightness and good fastness properties.

The present invention is directed to the condensation of the new 1,9-thiophenanthrone-2-carboxylic acid compounds of U. S. application 264,125 with aminoanthraquinones giving dyestuffs having the following general formula

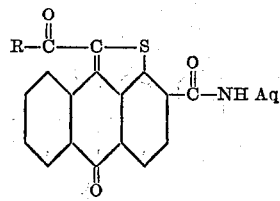

in which Aq stands for a radical of an anthraquinone compound and R has the same significance as above. In preparing these compounds the acid chloride of the thiophenanthrone carboxylic acid is heated in an organic solvent together with the amino anthraquinone compound at a temperature from 100 to 200° C. The dyestuff is filtered off, washed and dried. It is obtained in good yields and is of high purity.

The following examples are given to illustrate the invention. The parts used are by weight.

Example 1

17 parts of C-acetyl-1,9-thiophenanthrone-2-carbonyl chloride and 16.3 parts 1-amino-5-benzoyl-aminoanthraquinone are suspended in 340 parts nitrobenzene. The mixture is heated with agitation to 130–135° C. for one and one-half hours. The product, as fine needles, is filtered off and washed with nitrobenzene and finally alcohol.

This dyestuff gives remarkably bright yellow shades of good fastness on cotton from a red-brown vat. The product dissolves in concentrated sulfuric acid with a brownish-red coloration. It is represented by the formula:

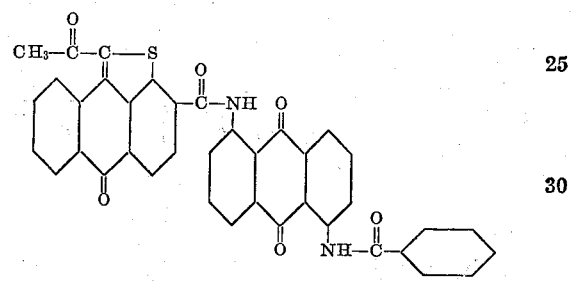

Example 2

12.4 parts of C-acetyl-1,9-thiophenanthrone-2-carbonyl chloride and 8.6 parts of 1-amino-6-chloroanthraquinone are suspended in 248 parts nitrobenzene. The mixture is heated with agitation to 130–135° C. and held for two hours. The product, as yellow needles, is filtered off and washed with nitrobenzene and finally with alcohol.

The product dyes cotton bright greenish-yellow shades of good fastness from a red-brown vat. The dyestuff dissolves in concentrated sulfuric acid with a yellowish-red color. It has the formula

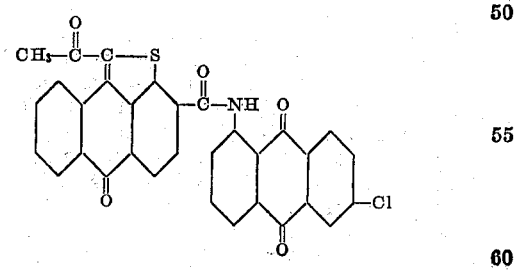

Example 3

12.4 parts of C-acetyl-1,9-thiophenanthrone-2-carbonyl chloride and 11.3 parts of 1-amino-4-benzoylamino-anthraquinone are suspended in 310 parts nitrobenzene. After heating for two hours at 130–135° C. with agitation, the reaction mixture is filtered. The product, as red needles, is washed with nitrobenzene and alcohol.

It dyes cotton brownish-orange shades from a brown vat. The product dissolves in sulfuric acid with a brownish-red coloration. The formula is:

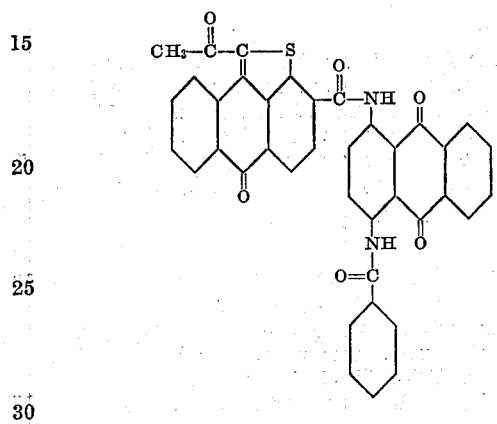

Example 4

21.4 parts of C-acetyl-1,9-thiophenanthrone-2-carbonyl chloride and 7.1 parts of 1,5-diaminoanthraquinone are suspended in 350 parts nitrobenzene. The mixture is heated to 175–180° C. and held for two hours with agitation. The product is filtered out, and washed with nitrobenzene and finally alcohol.

The product dyes cotton fast bright reddish-yellow shades from a brown vat. It dissolves in concentrated sulfuric acid with a yellowish-red color. The formula is:

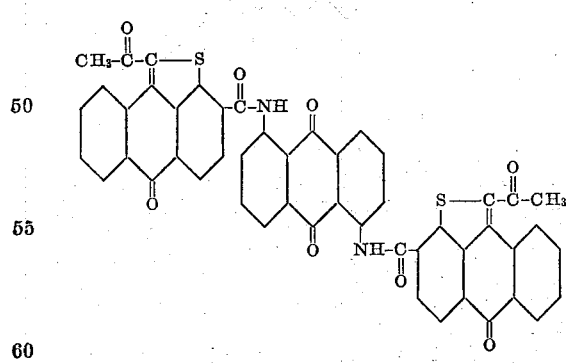

Example 5

14 parts of C-acetyl-1,9-thiophenanthrone-2-carbonyl chloride and 23.6 parts of 1-amino-5(2:1(N) - anthraquinonebenzacridone - 2' - carbonyl)-aminoanthraquinone are suspended in 600 parts of trichlorobenzene. The reaction mixture is heated with agitation to 205–210° C. and held for two hours. The product is filtered off and washed with trichlorobenzene, benzene and alcohol in turns.

It dyes cotton fast yellowish-orange shades from a dull brownish-violet colored vat. The product dissolves in concentrated sulfuric acid with a yellowish-red color, and has the formula:

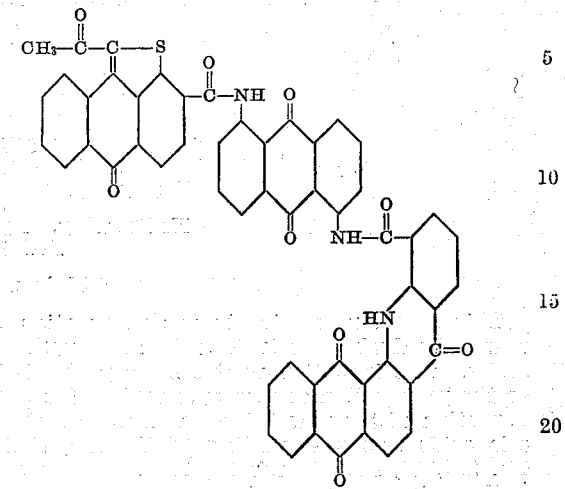

Example 6

11.8 parts of C-propionyl-1,9-thiophenanthrone-2-carbonyl chloride and 11.4 parts of 1-amino-5-benzoylaminoanthraquinone are suspended in 250 parts nitrobenzene. After heating for two hours at 130–135° C. the product is filtered off and washed with nitrobenzene and alcohol.

The product dyes cotton very bright yellow shades of good fastness from a red-brown vat. It dissolves in concentrated sulfuric acid with a brownish-red color. It has the formula:

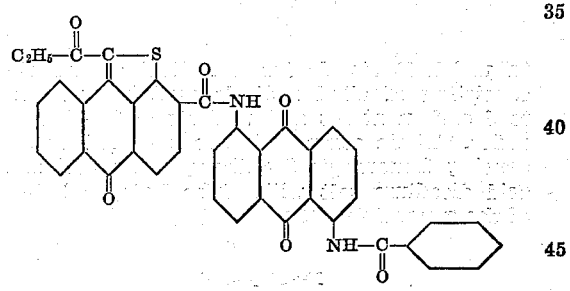

Example 7

14 parts of C-benzoyl-1,9-thiophenanthrone-2-carbonyl chloride and 11.4 parts of 1-amino-5-benzoylaminoanthraquinone were suspended in 300 parts of nitrobenzene. After heating for an hour at 130–135° C., the crystalline product is filtered off and washed with nitrobenzene and alcohol.

The product dyes cotton very bright yellow shades of good fastness from a reddish-brown colored vat. It dissolves in concentrated sulfuric acid with a brownish-red color. It has the formula:

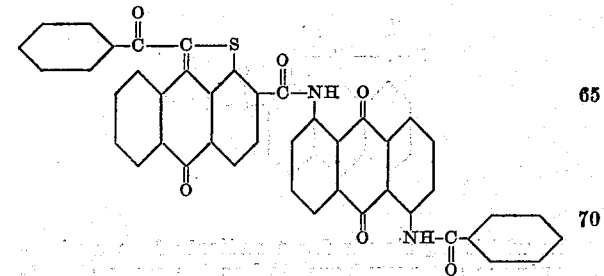

Example 8

17 parts of C-benzoyl-1,9-thiophenanthrone-2- carbonyl chloride and 10.3 parts of 1-amino-6-chloroanthraquinone are suspended in 270 parts of nitrobenzene. After heating an hour at 130–135° C. the crystalline product is filtered off and washed with nitrobenzene and alcohol.

It dyes cotton fast and bright greenish-yellow shades from a reddish-brown colored vat. It dissolves in concentrated sulfuric acid with a yellowish-red color and has the formula

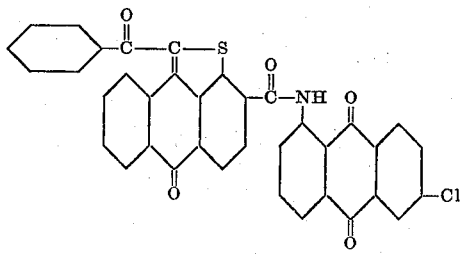

*Example 9*

14 parts of C-benzoyl-1,9-thiophenanthrone-2-carbonyl chloride and 11.4 parts of 1-amino-4-benzoylaminoanthraquinone are suspended in 250 parts nitrobenzene. The mixture is heated to 130–135° and held for one hour. The product is filtered off and washed with nitrobenzene and alcohol. It dyes cotton orange shades from a brown colored vat, and dissolves in sulfuric acid with a reddish color. It has the formula:

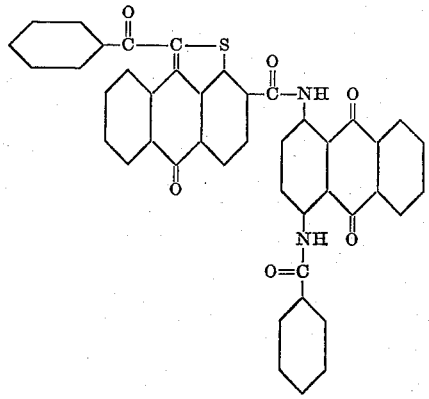

The products obtained according to the present invention are distinguished by their brightness of shade over the corresponding dyestuffs obtained by the use of 1,9-thiophenanthrone-2-carboxylic acid chloride which does not contain the acyl radical on the C-atom of the thiophene ring. Other aminoanthraquinone compounds may of course be substituted for those specifically mentioned in the examples.

I claim:

1. The new dyestuffs of the following general formula

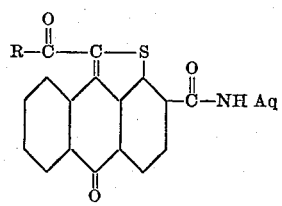

in which R stands for a substituent of the group consisting of alkyl radicals containing from 1 to 5 carbon atoms and aryl radicals of the benzene series containing not more than one benzene ring, said radicals being attached to the carbonyl radical directly thru carbon to carbon linkages, and Aq stands for a radical of an anthraquinone compound.

2. The new dyestuffs of the following general formula

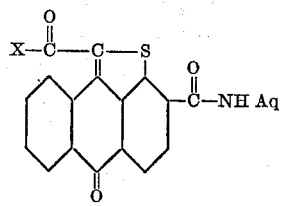

in which X stands for an alkyl radical of from 1 to 5 carbon atoms which are attached to the carbonyl radical directly thru carbon to carbon linkages, and Aq stands for a radical of an anthraquinone compound.

3. The dyestuff of the formula

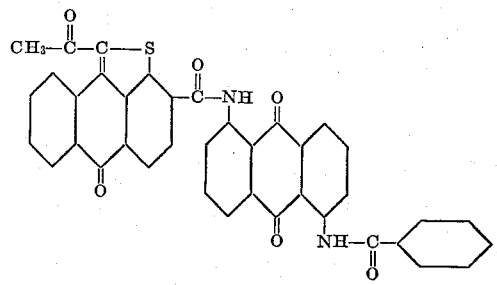

4. The dyestuff of the formula

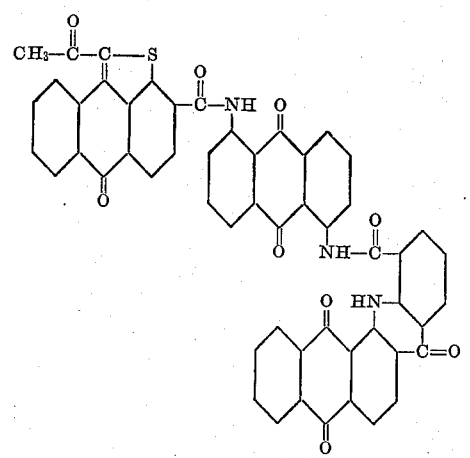

5. The dyestuff of the formula

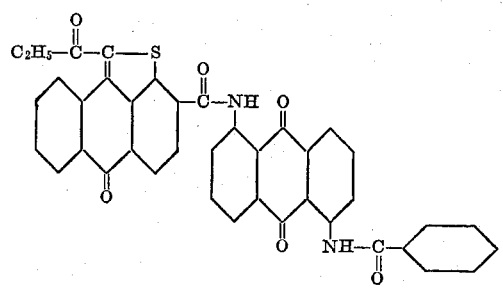

6. The new dyestuffs of the following general formula:
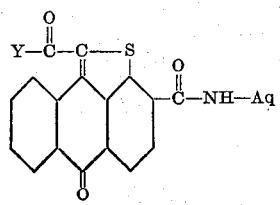
in which Y stands for an aryl radical of the benzene series which contains not more than one benzene ring and which is attached to the carbonyl radical directly thru carbon to carbon rings, and Aq stands for a radical of an anthraquinone compound.
FREDERIC BENNETT STILMAR.